3,311,421
DEVICE FOR THE CONTINUOUS PNEUMATIC FEEDING OF POWDERED OR GRANULAR MATERIAL
Otto Heinemann, Neubeckum, Westphalia, Germany, assignor to Polysius G.m.b.H., Neubeckum, Westphalia, Germany
Filed Feb. 9, 1966, Ser. No. 526,145
12 Claims. (Cl. 302—49)

This invention relates to a device for the continuous pneumatic feeding of powdered or granular material.

The problem frequently arises in practice of feeding powdered or granular materials of very differing properties with an available pneumatic feed device. Also it is in many cases necessary to be able to change the output of the feed device within wide limits, without reducing its efficiency and while maintaining continuous feed. Known feed devices meet these requirements very inadequately.

The object of the invention is thus to provide a device adapted for the continuous pneumatic feeding of powdered or granular material, which can readily be adapted to differing conditions and which is also marked by high operational reliability.

According to the invention this object is achieved by rotatably mounting, on a fixed vertical shaft provided with a main compressed air conduit and a material discharge pipe, a plurality of annularly arranged pressure containers, each having a separate closable material inlet, a compressed air inlet and a material exit pipe, the compressed air inlet and material exit pipe for each container leading to the periphery of the fixed shaft and being connected to the main compressed air conduit and the material discharge pipe during a specific angular section of the rotary movement of the container.

An important feature of the feed device of the invention is that the connection of the individual compressed air inlets and the opening of the material exit pipes belonging to the individual pressure containers is controlled by the movement of the pressure containers themselves, combined into a single rotary body, and that these pipes are opened and closed without normal valves. The device of the invention is therefore marked by exceptionally high operational reliability.

By altering the speed of rotation of the pressure containers about the fixed shaft, it is also possible to alter the output of the feed device continuously within wide limits while maintaining a continuous feed, without appreciably reducing the efficiency of the device.

In a preferred embodiment of the invention, the closable material inlet to each pressure container is operable by a pneumatic control piston, connected by means of a control pipe to the main compressed air conduit provided in the fixed shaft during a specific angular section α of the rotary motion of the container and to an exhaust pipe also provided in the fixed shaft and connected to the atmosphere, during a further angular section γ.

These and numerous further details of the invention will be apparent from the following description of one embodiment shown in the drawings. In the drawings.

Figure 1:
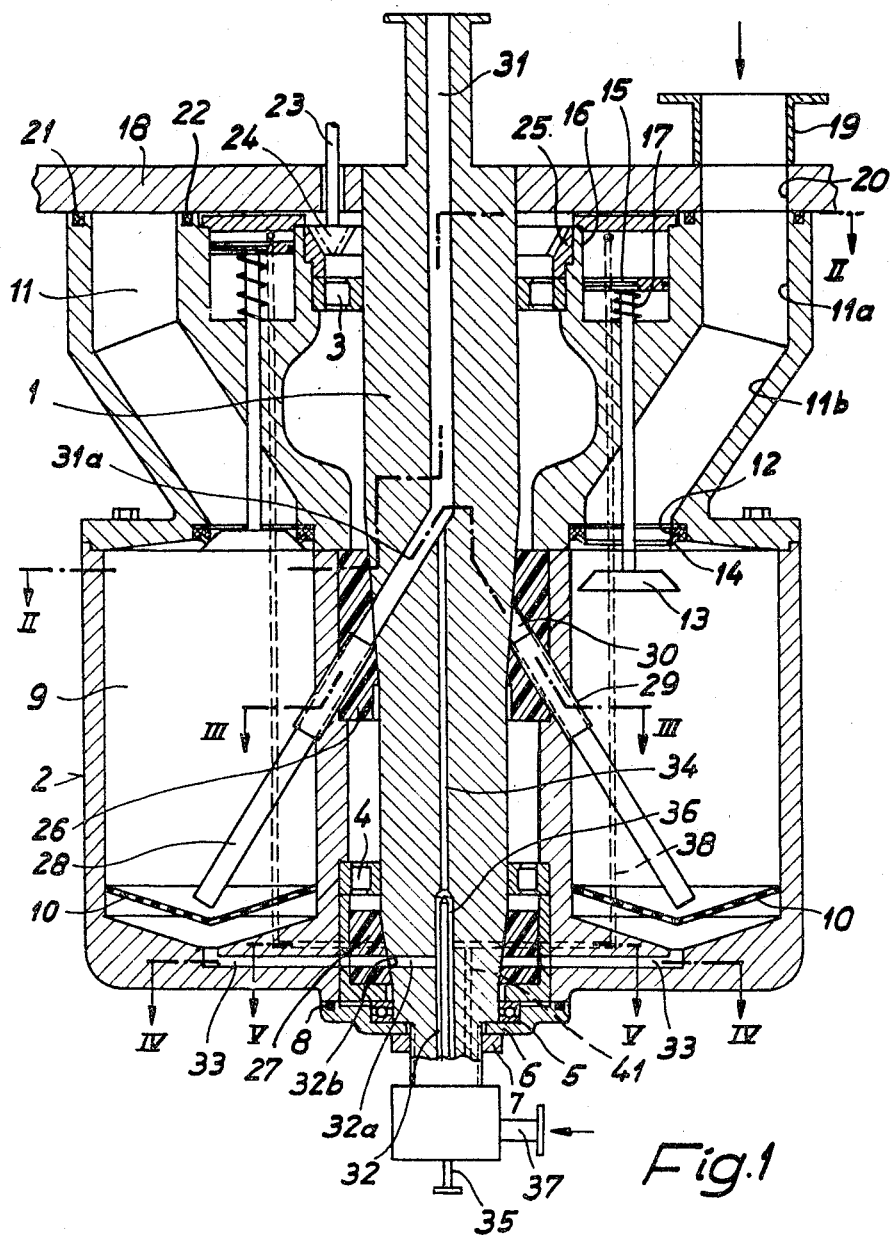
FIGURE 1 is a vertical section of the feed device of the invention.

The feed device shown in the drawings contains a fixed vertical shaft 1, upon which is mounted a rotary body 2, supported on the fixed shaft by two radial bearings 3, 4 and an axial bearing 5. The lower bearing shell of the axial bearing 5 rests on a ring 6, attached to the fixed shaft 1 by a nut 7. A sealing ring 8 is provided between the ring 6 and the rotary body 2.

In the embodiment shown, the rotary body 2 is provided with six pressure containers 9, each provided with a pervious base 10 running conically to the center of the pressure container.

The six containers 9 have a common filling hopper 11 forming the upper part of the rotary body 2. This hopper 11 is annularly shaped in its upper section 11a and in its lower section 11b is divided into individual sector-shaped chambers corresponding to the pressure containers 9.

Figure 2:
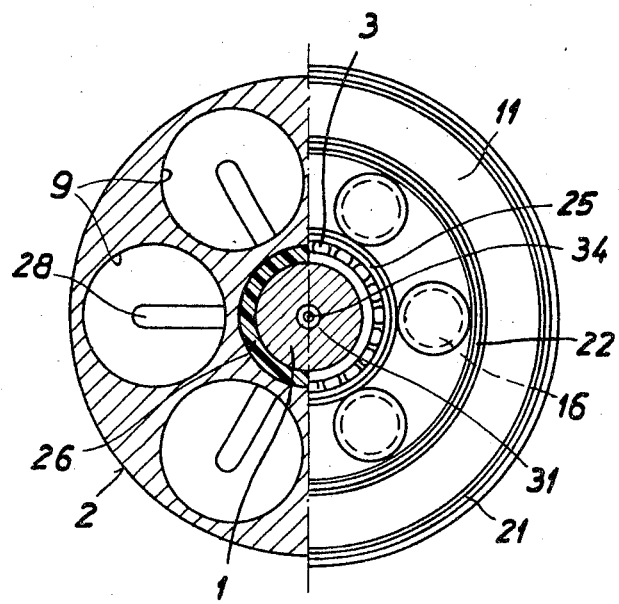
FIGURES 2, 3, 4 and 5 are sections along the lines II—II, III—III, IV—IV and V—V, respectively, of FIGURE 1.

The filling hopper 11 is connected to each of the individual containers 9 by a material inlet 12 closable by a valve plate 13. Proper sealing is provided by a sealing element 14 on the valve seat. The individual valve plates 13 are each actuated by a control piston 15 movable in a cylinder 16 and biased upwards by a compression spring 17. The cylinders 16 with the control pistons 15 are disposed in a circle at the same annular intervals as the pressure containers 9, in the upper section 11a of the filling hopper 11 (see FIGURES 1 and 2).

At its top, the fixed shaft 1 is connected with a plate 18 which covers the hopper 11 and carries a connecting pipe 19 for feeding material, adjoining an aperture 20 provided in the plate 18. For upward sealing of the hopper 11, the rotary body 2 carries two annular sealing elements 21, 22 bearing against the underside of the plate 18.

The plate 18 is also provided with a transverse bearing for a drive shaft 23 carrying a pinion 24 engaging an internal gear 25 affixed to the inner periphery of the rotary body 2. On the plate 18 also is disposed a drive for the shaft 23, not shown.

The rotary body 2 carries two annular parts 26, 27 of insulating material, provided in the manner described below with bores intended for the passage of compressed air or of material.

These parts 26, 27, made of an insulating material with a low coefficient of friction, fit against the outer periphery of the fixed shaft 1 and perform a sealing function to be described in more detail below. Because of their low co-efficient of friction, these parts 26, 27 of insulating material permit easy movement of the rotary body 2 about the fixed shaft 1.

Into each pressure container 9 projects an obliquely disposed tube 28 forming part of the material exit, with its end lying closely above the lowest point of the pervious container base 10. These tubes 28 are each screwed into a metal bush 29, mounted in turn in the wall of the container 9 and in the insulating part 26. The tubes 28 and the aligned bores in the insulating part 26 thus form six material outlets 30 evenly disposed around and extending to the periphery of the fixed shaft 1 (see FIGURE 3). In the shaft 1 is provided a material discharge pipe 31 running in general axially, but at its lower end 31a extending obliquely outwards to the periphery of the shaft 1 and being broadened into sector shape (see FIGURES 1 and 3.

The six pressure containers 9 are each associated with a compressed air inlet 33 extending through the insulating material 27 to the periphery of the fixed shaft 1 and at the other end terminating under the pervious base 10 of the container 9.

Between the main compressed air conduit 32 and the material discharge pipe 31 is an axially extending auxiliary conduit 34 by which compressed air can be fed directly from the main conduit 32 into the discharge pipe 31, by-passing the pressure containers 9. A control member 36 movable longitudinally by a hand-wheel 35 is provided in the main air conduit 32 to adjust the amount of compressed air entering the auxiliary conduit 34. Compressed air is fed to the main conduit 32 by a connecting pipe 37.

Figure 5:
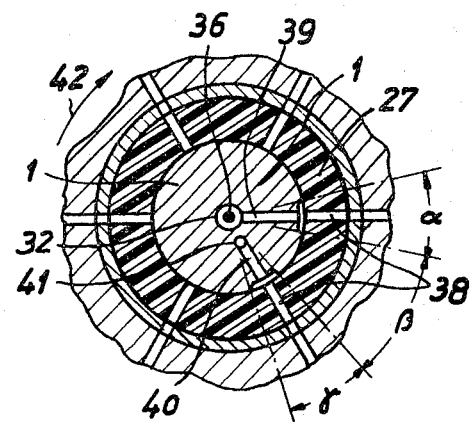

Each control piston 15 is also provided with a control conduit 38 formed in the rotary body 2 and also passing through the insulating part 27 to the periphery of the fixed shaft 1. At the same level in the shaft 1 are an air feed inlet 39 connected to the main air conduit 32, and an exhaust conduit 40 connected to the atmosphere by an axial tube 41 (see FIGURES 1 and 5). The air feed inlet 39 and the exhaust conduit 40 have broadened portions at the periphery of the fixed shaft 1 (see FIGURE 5).

The feed device shown operates as follows: The rotary body 2 with the filling hopper 11 and the six pressure containers 9 is set in uniform rotation about the fixed shaft 1 by the drive shaft 23. If the processes now occurring in one of the six containers 9 and its associated parts during one rotation are observed, we find:

Since there is initially no pressure in the cylinder 16 and the control piston 15 is thus forced upwards by the spring 17, the valve plate 13 at first keeps the material inlet 12 closed. During this period the part of the hopper 11 belonging to the observed container 9 runs under the connecting pipe 19 and is filled with material. The control conduit 38 corresponding to the piston 15 belonging to the observed container 9 then comes into the zone of the air feed inlet 39 (see FIGURE 5). Then while the rotary body 2 turns through the angle α (see FIGURE 5) in the direction of the arrow 42, the control piston 15 of the observed container 9 is fed with compressed air via the inlet 39 and the control conduit 38, which lifts the valve plate 13 from its seat, so that the material inlet 12 is opened. The quantity of material located in the part of the hopper 11 lying above the considered container 9 thus falls under the effect of gravity into the pressure container 9. In general this process takes place during movement of the rotary body 2 through the angle β (see FIGURE 5). Although feed of compressed air to the cylinder 16 is interrupted over this angular zone, the pressure existing in the cylinder is maintained, since the control conduit 38 is blocked over the zone of angle β by the fixed shaft 1.

The control conduit 38 of the control piston 15 corresponding to the observed container 9 then reaches the area of the exhaust conduit 40. The cylinder 16 of the pressure piston 15 is exhausted via this conduit 40 and the axially directed tube 41, open to the atmosphere, while the rotary body is turning through the angle γ, so that the stressed spring 17 forces the control piston 15 and hence the valve plate 13 upwards, and the material inlet 12 is again closed. The container 9 is now filled with a certain quantity of material and is externally airsealed.

Figure 4:
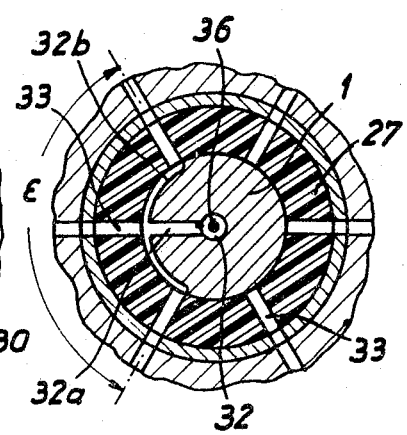

On further movement of the rotary body 2, the compressed air inlet 33 corresponding to the observed container 9 next reaches the broadened area 32b of the main compressed air conduit 32. (see FIGURE 4). Compressed air thus flows through the air inlet 33 into the pressure container 9 and after passing through the pervious base 10 in diffused form reaches the material located in the container 9, so that this material is loosened and put into a fluidized condition. Simultaneously pressure rises in the container 9.

Figure 3:
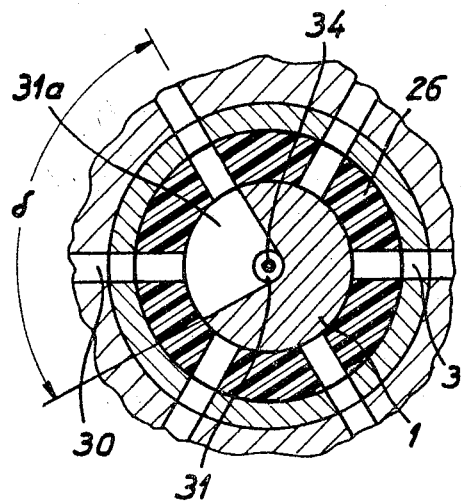

During further rotary movement, the material outlet 30 of the observed container 9 then reaches the area of the sector-shaped broadening 31a in the material discharge pipe 31 (see FIGURE 3). The material in the pressure container 9 is then upwardly ejected, through the material outlet 30 of the observed container 9 and the common discharge pipe 31, by the further compressed air fed to the container via the air inlet 33. This process takes place while the rotary body 2 is turning through the angle δ (see FIGURE 3). Compressed air is however fed to the container 9 over a slightly larger angle ε, since it begins to be fed somewhat before the ejection of material (see FIGURE 4).

When the material outlet 30 of the observed container 9 leaves the angular zone δ comprising the sector-shaped broadening 31a of the material discharge pipe 31, the pressure container 9 is completely emptied. The supply of compressed air to this container (angle ε in FIGURE 4) is simultaneously stopped, since the container compressed air inlet 33 leaves the angular zone ε formed by the broadening 32b of the main compressed air inlet 32.

The observed pressure container 9 has thus completed a full operating cycle. The processes in the other five containers 9 proceed in the same manner, each displaced by 60° from the next. Since at least one partly filled container 9 is always connected to the discharge pipe 31 (see FIGURE 3), there is a completely continuous and uniform discharge of the powdered or granular material. The output of the device can be varied within wide limits by changing the speed of the rotary body 2, or by adjusting the total air pressure and the partial stream of air fed through the auxiliary conduit 34 directly into the material discharge pipe 31.

Having described the invention, I claim:

1. A device for the continuous pneumatic feeding of finely divided material, comprising a fixed vertical shaft provided with a main compressed air conduit and a material discharge conduit, a plurality of annularly arranged pressure containers rotatably mounted on the shaft, each having a separate closable material inlet, a compressed air inlet, and a material exit pipe, the compressed air inlet and material exit pipe of each container leading to the periphery of the shaft and being in communication with the main compressed air conduit and the material discharge conduit, respectively, during a specific portion of each revolution of such container about the shaft.

2. A device as in claim 1, comprising a pneumatic control piston for actuating the closable material inlet of each container, which is connected by a control conduit to the main compressed air conduit during a specific portion of each revolution of such container, and to a vent during a further specific portion of each revolution of such container.

3. A device as in claim 1, wherein the compressed air inlet of each container is connected to the bottom of the container, and a pervious false bottom is arranged in each container above the inlet connection.

4. A device as in claim 3 wherein during the rotation of the containers about the shaft, the connection between the compressed aird inlet of each container and the main compressed air conduit is made before the connection between the material exit pipe of such container and the material discharge conduit, to cause the material to be loosened and to cause the pressure to be increased in the container before the discharge of the material from the container begins.

5. A device as in claim 3 wherein the pervious false bottom of each container is concave, and the material exit pipe of each container comprises a tube extending obliquely into the container and terminating just above the lowest point of the false bottom.

6. A device as in claim 1 comprising a common filling hopper concentric with the shaft, which has an annular upper portion, and has its lower portion divided into individual chambers each of which overlies the closable material inlet of one of the pressure containers.

7. A device as in claim 6 comprising a material feed spout discharging into the filling hopper, and means for opening the closable material inlet of each pressure container during each revolution of the container after the hopper chamber overlying such inlet has passed under the material feed spout.

8. A device as in claim 1 wherein the portions of the material exit pipes and the compressed air inlets which are adjacent to the periphery of the shaft are composed of bores in parts which are made of insulating material of a low coefficient of friction and which rotate with the containers and fit closely upon the shaft.

9. A device as in claim 1 wherein the main compressed air conduit and the material discharge conduit consist of conduits extending longitudinally in the shaft and have an adjustable connection for supplying compressed air to the material discharge conduit.

10. A device as in claim 9 wherein the main compressed air conduit is substantially coaxial with the material discharge conduit and has disposed therein a control member for adjusting the flow of compressed air entering the material discharge conduit.

11. A device as in claim 1 wherein the main compressed air conduit extends longitudinally through one end of the shaft and the material discharge conduit extends longitudinally through the other end of the shaft.

12. A device as in claim 1 wherein the rotatable assembly of pressure containers is mounted on the shaft by means of a thrust bearing and at least one radial bearing, and is provided with a drive for rotating the assembly at a selected speed.

References Cited by the Examiner
UNITED STATES PATENTS 2,740,672  4/1956  Morrow _____ 302—49
3,203,738  8/1965  Forsyth _____ 302—49

EVON C. BLUNK, *Primary Examiner.*

H. C. HORNSBY, *Assistant Examiner.*